L. E. TREADAWAY & W. T. STEPHENS.
AUTOMATIC FILM WINDING ATTACHMENT FOR CAMERAS.
APPLICATION FILED NOV. 13, 1915.
1,201,002.
Patented Oct. 10, 1916.
2 SHEETS—SHEET 1.
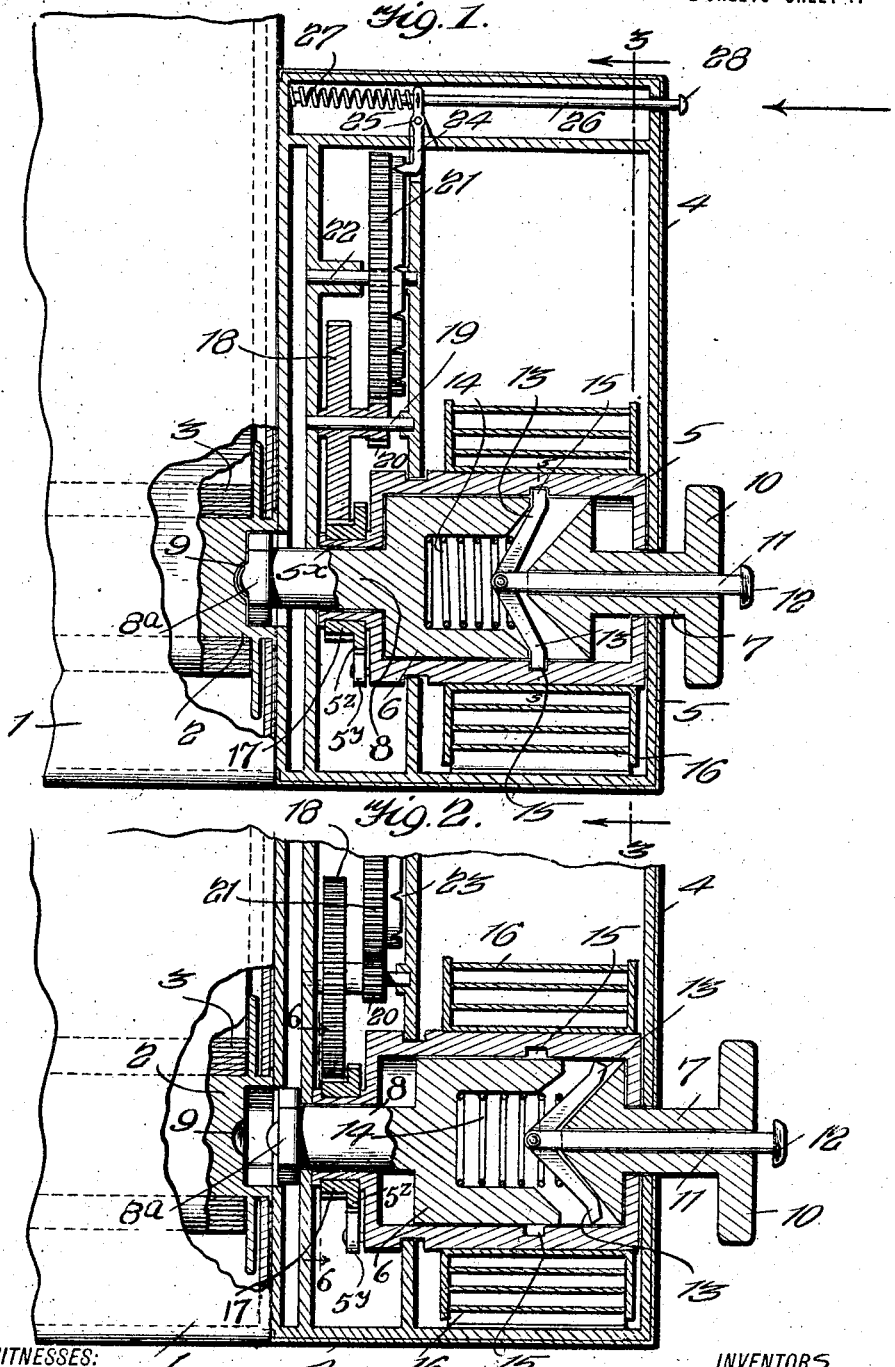
WITNESSES:
INVENTORS
LINTON E. TREADAWAY,
WILLIAM T. STEPHENS,
BY Munn & Co.
ATTORNEYS

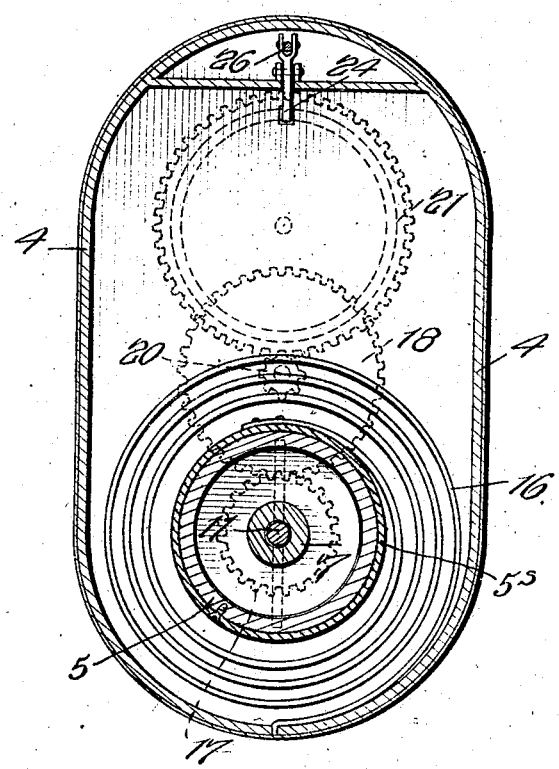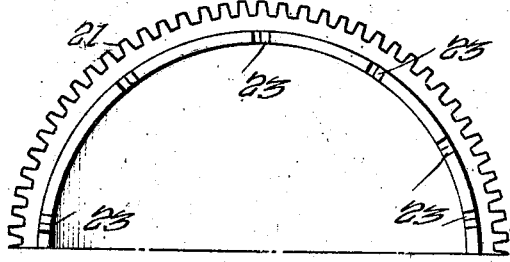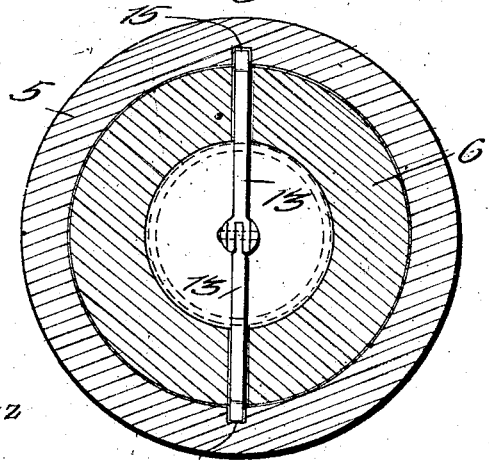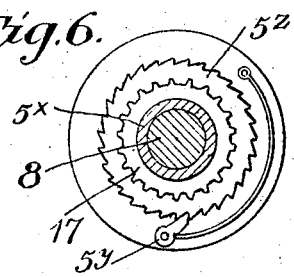

UNITED STATES PATENT OFFICE.

LINTON EVERETT TREADAWAY AND WILLIAM THOMAS STEPHENS, OF DE LAND, FLORIDA.

AUTOMATIC FILM-WINDING ATTACHMENT FOR CAMERAS.

1,201,002.

Specification of Letters Patent.

Patented Oct. 10, 1916.

Application filed November 13, 1915. Serial No. 61,295.

*To all whom it may concern:*

Be it known that we, LINTON E. TREADAWAY and WILLIAM T. STEPHENS, citizens of the United States, and residents of De Land, in the county of Volusia and State of Florida, have invented a certain new and useful Improvement in Automatic Film-Winding Attachments for Cameras, of which the following is a specification.

Our invention relates to improvements in automatic film-winding attachments for cameras, and it consists in the combinations, constructions, and arrangements herein described and claimed.

An object of our invention is to provide an attachment for cameras by means of which the film may be automatically wound upon the winding spool so as to bring the portions of the film successively into operative relation with the lens of the camera.

A further object of our invention is to provide a device of the type described which is provided with means for accurately stopping the film winding mechanism at a predetermined point so as to insure the movement of the films to the proper position for taking the picture.

A further object of the invention is to provide a device of the type described which may be automatic in its action or which may be manipulated manually when it is desired to turn the film reel by hand.

Other objects and advantages will appear in the following specification and the novel features of the invention will be particularly pointed out in the appended claims:

Our invention is illustrated in the accompanying drawings forming part of this application in which—

Figure 1 is a sectional view through the attachment, a portion of the camera also being shown in section. Fig. 2 is a similar view showing the parts in their different positions. Fig. 3 is a section along the line 3—3 of Fig. 1. Fig. 4 is a face view of a portion of the notched wheel. Fig. 5 is a section along the line 5—5 of Fig. 1, and Fig. 6 is a detail view of the ratchet mechanism.

In carrying out our invention, we make use of a camera 1 having a winding spool or reel 2 of the ordinary construction, upon which the film 3 may be wound.

Secured to the main body portion 1 of the camera is a casing 4 which contains the winding mechanism which forms the subject of this invention. This casing is provided on its interior with a hollow cylindrical drum 5, on the interior of which is disposed a spindle 6 having reduced end portions 7 and 8 extending through openings in the opposite sides of the casing 4. The end portion 8 is provided with a key member $8^a$ which is designed to enter a slot 9 in the reel 2 so as to turn the latter when the spindle 6 is turned. The reduced portion 7 terminates in an integral hand wheel 10.

Extending through the reduced portion 7 is a slidable rod 11 which is provided with a push button 12 at its end. This rod is pivotally connected at its inner end to angularly disposed locking members 13 which extend through the walls of the spindle 6 and which are pressed upon by a spiral spring 14. The ends of the members 13 are adapted to enter notches 15 in the walls of the drum 5. Secured to the drum 5 so as to revolve with it is a flanged sleeve $5^s$ bearing a spiral spring 16, one end of which is attached to the sleeve $5^s$ and the other end to the wall of the casing 4. A spring pressed pawl $5^y$ engages a ratchet $5^z$ formed on the drum 5.

Mounted on the reduced portion $5^x$ of the drum 5 is a gear 17 which engages a gear 18 on a shaft 19. The latter is provided with a gear 20 which engages a gear 21 on a shaft 22. The gear 21 is provided on one of its faces with a series of notches 23, see Fig. 4. A locking pawl or dog 24 is pivotally mounted at 25, one end being bent to engage the notches 23 and the other end being pivotally connected with its push rod 26 which is pressed upon by a spring 27 whose end 28 extends outside of the casing 4.

From the foregoing description of the various parts of the device, the operation thereof may be readily understood. Before the film 3 is inserted on the empty reel 2, the end 28 of the rod 26 is depressed, thereby withdrawing the dog 24 from the notches 23. The handwheel 10 may now be turned to rotate the drum 5 which through the medium of the pawl and ratchet connection, will wind the spring 16 on the sleeve 5s, the members 13 being in the notches 15. When the spring has been wound to sufficient tension, the rod 26 is released, thereby causing the pawl or dog 24 to enter the notch 23. As will be seen from Fig. 1, these notches are not at regular intervals. In certain cameras, the winding spool makes twenty-five revolutions in winding the film. Of these twenty-five revolutions, eight revolutions are made before the film is brought into position to be exposed for taking the first picture, then after three and one-half revolutions the second position is reached, and proportionately less revolutions as the spool or reel becomes filled. Now the notches 23 are set in reference to the number of revolutions required for moving the film from one position to the next position for exposure. With the apparatus set up as shown in Fig. 1, it is now only necessary to depress the rod 26 by pressing the button 28. This will free the pawl 24 and permit the winding train to unwind, but since the spindles 6 and 5 are locked together, it will cause the winding of the film onto the reel 2. As soon as the adjacent notch 23 is reached, then the locking dog 24 enters it and stops the movement of the film. When the next picture is to be taken, all that is necessary to do is to press the button 28, and this will bring the film to the proper position for exposure, as explained.

In Fig. 2 we have shown the parts in different positions. In this figure, the hand wheel 10 is pulled outwardly, and in order to do this, the end 12 of the rod 11 is at first pushed inwardly, so as to free the ends of the members 13 from the notches 15. This disconnects the members 6 and 5, and permits the spindle 6 to be moved outwardly, thus disconnecting the key portions 8ᵃ from the socket 9 in the reel 2. The reel may now be wound or unwound without reference to the automatic winding. It is also obvious that by pushing inwardly on the handwheel 10, the spindle 6 may be brought into such position as to connect the reel 2 with the key 8ᵃ so that the reel may be turned in either direction manually, and this without affecting the automatic operation of the reel. When the parts are restored to the position shown in Fig. 1, then the automatic feature comes into play.

By the use of this attachment, the manual winding of the reel may be dispensed with, it only being necessary for one to press the button 28 to bring the film into position for exposure.

We claim:—

1. In a film winding attachment for cameras, a casing adapted to be secured to the body of the camera, a rotatable drum disposed within the casing, spring means for rotating the drum, a spindle disposed within the drum, means carried by the spindle for engaging a film winding spool of the camera, means for connecting or disconnecting said spindle from the drum, means for stopping the drum after a predetermined amount of rotation, said last-named means comprising a gear train operatively connected with said drum, one of said gears having a series of notches, a spring actuated locking dog arranged to enter said notches successively, and means for releasing the spring-actuated locking dog.

2. In a film winding attachment for cameras, a casing adapted to be secured to the body of the camera, a rotatable drum disposed within the casing, spring means for rotating the drum, a spindle disposed within the drum, means carried by the spindle for engaging a film winding spool of the camera, spring pressed arms for connecting or disconnecting said spindle from the drum, means for stopping the drum after a predetermined amount of rotation, said last-named means comprising a gear train operatively connected with said drum, one of said gears having a series of notches, a spring actuated locking dog arranged to enter said notches successively, and means for releasing the spring-actuated locking dog, said last named means comprising a spring-pressed rod pivotally connected with said locking dog, one end of said rod being arranged to extend through the casing.

3. In a film winding attachment for cameras, a casing, a hollow drum within the casing, a spindle disposed within the drum, spring pressed arms for connecting or disconnecting said spindle with the walls of the drum, a spring for rotating the drum, one end of said spindle being arranged to engage the film spool of a camera, and means for operating said spring pressed arms from the exterior of the casing.

4. In a film winding attachment for cameras, a casing, a rotatable drum disposed within said casing, said drum being hollow, a spindle disposed within the drum, and having reduced portions arranged to extend through the casing, one of said reduced portions being provided with a hand wheel and the other being formed into a key adapted to enter a slot in the film spool of the camera, expansion arms carried by said spindle and adapted to enter notches in the walls of the drum, and means for operating said expansion arms.

5. In a film winding attachment for cameras, a casing, a rotatable drum disposed within said casing, said drum being hollow, a spindle disposed within the drum and having reduced portions arranged to extend through the casing, one of said reduced portions being provided with a hand wheel and the other being formed into a key adapted to enter a slot in the film spool of the camera, expansion arms carried by said spindle and adapted to enter notches in the walls of the drum, and means for operating said expansion arms, said last-named means comprising a push rod extending through the end of the spindle and being pivotally connected with said expansion arms, and a spiral spring disposed in the body of the spindle and adapted to bear on the arms.

In testimony whereof we have hereunto set our hands this 26th day of October, 1915.

LINTON EVERETT TREADAWAY.
WILLIAM THOMAS STEPHENS.

Witnesses:
J. S. ROGERS,
E. L. POWE